United States Patent [19]

Schantz

[11] Patent Number: 4,727,237

[45] Date of Patent: Feb. 23, 1988

[54] PYROLYSIS COATED OPTICAL FIBER SPLICES: APPARATUS AND METHOD

[75] Inventor: Christopher A. Schantz, Redwood City, Calif.

[73] Assignee: Hewlett-Packard Company, Palo Alto, Calif.

[21] Appl. No.: 22,858

[22] Filed: May 4, 1987

[51] Int. Cl.⁴ .............................................. B23K 26/00
[52] U.S. Cl. ...................... 219/121 LC; 219/121 LE; 219/121 LF; 219/121 FS; 219/121 LD; 350/96.21
[58] Field of Search ................. 219/121 LC, 121 LD, 219/121 LE, 121 LF, 121 FS; 350/56.20, 56.21

[56] References Cited

U.S. PATENT DOCUMENTS 4,263,495  4/1981  Fujita et al. ............... 219/121 LZ X
4,557,556  12/1985  Decker, Jr. ..................... 350/96.21
4,557,557  12/1985  Gleason et al. .................. 350/96.21
4,598,974  7/1986  Munn et al. ...................... 350/96.21

Primary Examiner—C. L. Albritton
Attorney, Agent, or Firm—Paul L. Hickman

[57] ABSTRACT

A splicing apparatus includes a chamber which serves as a locus of functional convergence for a fiber holder, a laser and a viewing system. This arrangement permits several procedural steps, including a splicing operation and a hermetic coating operation to be performed using a single thermal laser heat source and without significantly disturbing the fibers between operations. The apparatus and the method practiced yield a splice which is comparable in optical, mechanical and physical properties to the original cable. Thus, for example, hermetically sealed optical fiber cables suitable for oil-well logging can be manufactured by splicing together the more limited cable lengths available using drawing techniques alone.

40 Claims, 15 Drawing Figures

PYROLYSIS COATED OPTICAL FIBER SPLICES: APPARATUS AND METHOD

BACKGROUND OF THE INVENTION

The present invention relates to splicing apparatus and methods, particularly as applied to optical fibers.

Optical fibers are finding increasing applications in many disciplines. Perhaps most notable among these applications is communications where optical fibers are replacing electronic cables as information carriers of choice. In some applications, such as oilwell logging, extremely long, high-strength, moisture resistant fiber optical cables are required.

Optical fibers are typically drawn from a rod. This drawing approach can form very long fibers, but it is not practicable to form single fibers long enough for many oil-well logging projects. Thus, splicing technology emerges as a critical element in such applications. This is in addition to the importance of splicing technology in repairing damaged cables and renovating cable networks already in place.

In the case of a cable repair, a damaged segment can be removed, the outer layers stripped back, and the remaining ends cleaved and fused to form a splice. Generally, this splice is weaker than the original fiber, so strain relief devices are added in addition to intermediate buffer layers, and other layers specific to the cable of interest. The strain relief devices and other post-manufacture coverings tend to bulge relative to the original coverings remaining on either side of the splice. This is not particularly awkward in some repair situations, but it can be problematic where space is at a premium.

However, where a very long cable is to be originally formed from segments and delivered on a spool, bulky splices are to be avoided, especially in diameter critical applications such as oil-well logging. It is much more difficult to wind and unwind a spool with a fiber cable with significant bulges along its length. Furthermore, even despite strain relief, a new cable can be subject to considerable bending and stress during installation, so that relatively weak splice points can be a source of unreliability.

Splice locations are not only a source of mechanical weakness. They tend to be the locus of transmission losses due to core misalignment and end surface reflections. Thus, if the alignment during splicing is imperfect, a multi-segment cable can have unacceptable light loss. Even if the cable is aligned sufficiently just after splicing, minor physical damage at splice locations can cause optical performance to drop below a satisfactory level.

The problems with splices are complicated in the case of hermetically sealed and other specially coated fibers. Moisture can readily penetrate most fiber jacket and buffer materials and attack the fiber itself so as to weaken it. This weakening can be quite dramatic over an extended period of time. To prevent this attack, the fiber can be coated with a hermetic seal so that moisture penetrating the outer layers of a fiber cable cannot reach the fiber itself.

U.S. Pat. No. 4,512,629 to Hansen et al. discloses an approach to manufacturing a fiber cable in which a hermetic coating is applied to the fiber as it is being formed off a draw tower. Before the drawn fiber has a chance to cool it is exposed to methyl acetylene or other carbon-bearing gas. The pyrolysis of the methyl acetylene in a non-oxidizing environment yields a carbon film on the fiber. This glassy film serves as an effective hermetic seal.

However, if conventional splicing techniques are used, this seal is necessarily broken at the splices. When exposed to water molecules, the splices become weak links in the fiber optical chain greatly diminishing the value of the intact hermetic seal. The problem is compounded in that, in a cable with a hermetically sealed fiber, the splice is both the physically weakest point to begin with and the most vulnerable to attack by moisture.

One approach considered is to place a spliced fiber in a heated chamber containing methyl acetylene to form an amorphous carbon coating over the exposed fiber just after splicing. However, splices coated in this matter have failed to provide strength and moisture resistance comparable to that of the splice-free portions of the cable. It is believed that the coating so applied includes small chunks which are relatively susceptible to damage during cable tension and flexure, and are relatively likely to permit moisture to penetrate to the fiber.

Thus, there are several problems with existing splicing technology. These include, splice bulk, splice weakness, poor optical performance at the splice and breach of a hermetic seal at the splice. Accordingly, an object of the present invention is to provide a splicing method and apparatus for forming splices which differ minimally from the rest of the incorporating cable in diameter, in mechanical performance, in optical performance, and in resistance to attack by moisture. In particular, optical fiber cables suitable for oilwell logging are needed.

SUMMARY OF THE INVENTION

The foregoing objectives are addressed by a method and apparatus in which splicing is performed in a spatial region which can be filled with a reactant gas so that the spliced fiber can be heated and then coated by pyrolysis of the reactant gas at the fiber surface. The region can be defined by a chamber. The fiber can be heated by a laser or other means for preferentially heating the fiber in relation to the surrounding gas to promote heterogeneous nucleation. This arrangement allows for a series of heat-utilizing steps to be performed with minimal disturbance to the ends to be spliced and the resulting spliced fiber. This yields a coating similar to that obtained when pyrolysis is initiated at the draw tower, without the particulate components that appear to result when homogeneous nucleation in the gas away from the fiber causes precipitation which contaminates the fiber surface.

Preferably, the chamber includes multiple ports for insertion and relative positioning of the fiber leads, admitting laser radiation, and viewing the alignment of the fiber leads. A fiber holder can allow mounting of the leads external to the chamber, insertion of the mounted leads into the chamber, and relative positioning of the leads. A gas handling system is provided for controlling the gas flow and mixture in the chamber.

Depending on the nature of the fibers and coatings involved, the method of the present invention can include: preparation of the fiber leads to be spliced, mounting of the fiber leads, insertion of the fiber leads into the reaction chamber, removal of old coating material from each fiber lead end, shaping and cleaning the ends to be spliced, splicing, fusing any particulate fiber material into the fiber surface, introducing reactant gas into the chamber, heating the fiber to induce pyrolysis at the fiber surface so that the desired coating forms, purging the reactant gas, removing the coated fiber from the chamber, and molding a protective buffer layer over the spliced region.

The method can be altered to accommodate different fibers and different coatings. When used to provide a hermetic coating over a splice between two hermetically sealed fibers, the resulting splice is optically, mechanically and physically comparable to the splice-free portions fiber. Preferably, an optical time-delay reflection (OTDR) device can be used during the splicing procedure to minimize optical loss at the splice.

An advantage of the present invention is that the hermetically sealed splice is not significantly weaker than the splice-free regions of the fiber, and after the protective coating is molded, no more bulky than the original fiber cables. Thus, this splicing method can be used to manufacture very long cables which greatly exceed the lengths practically achievable using fiber drawing from preforms alone. Another advantage of the present invention is that the hermetic seal is integral with the original hermetic seal so that degradation due to moisture is negligible. In a demonstration of the ability of a splice formed in accordance with the present invention to withstand severe environmental conditions, such a splice lasted six months in an acidic bath that destroyed a conventionally formed splice in five minutes. Other advantages and features of the present invention are apparent in the description below in connection with the following drawings.

DESCRIPTION OF THE PREFERRED EMBODIMENTS

Figure 1:
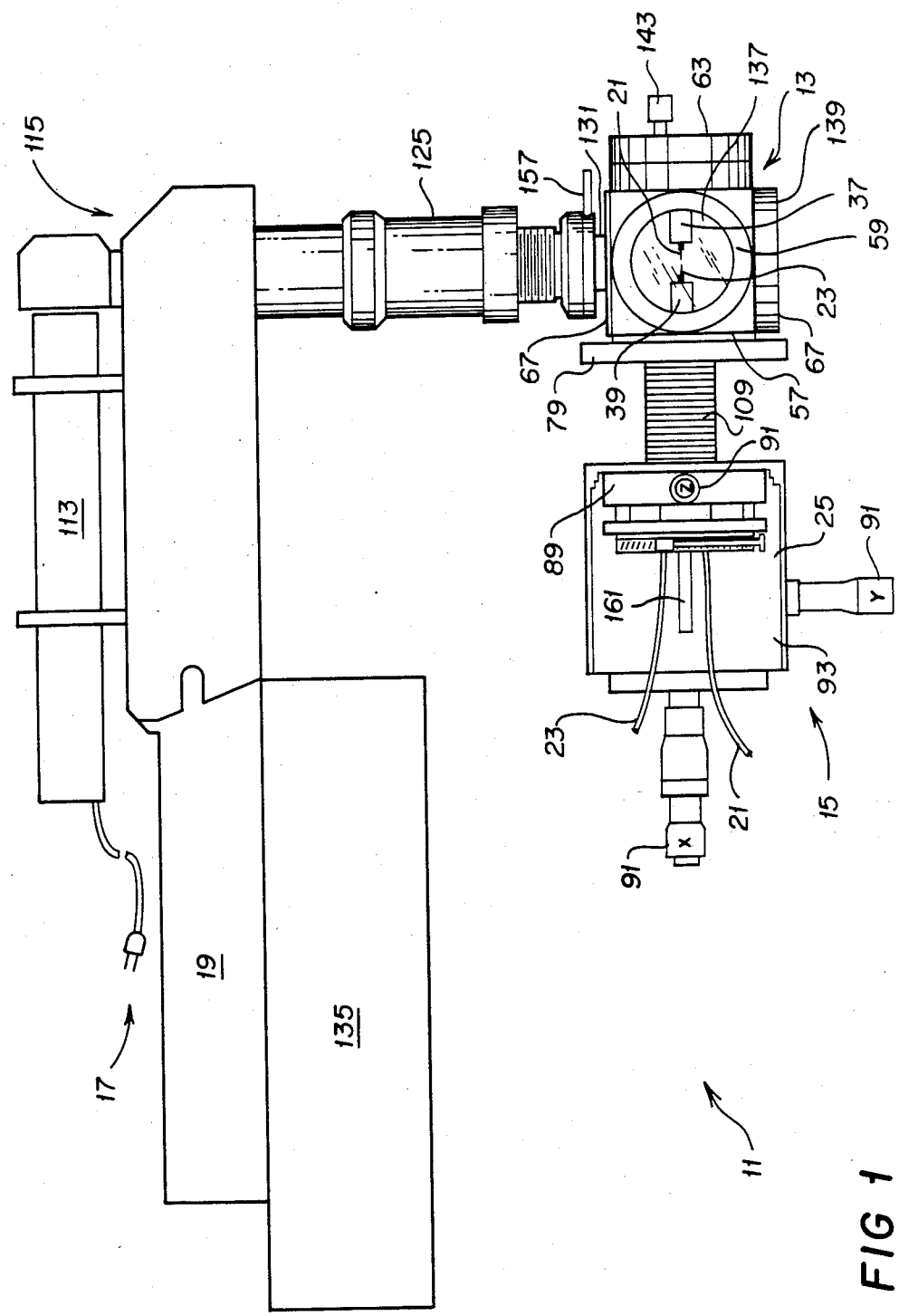
FIG. 1 is a simplified, top plan view of a splicer for fiber optical cables in accordance with the present invention.
Figure 2:
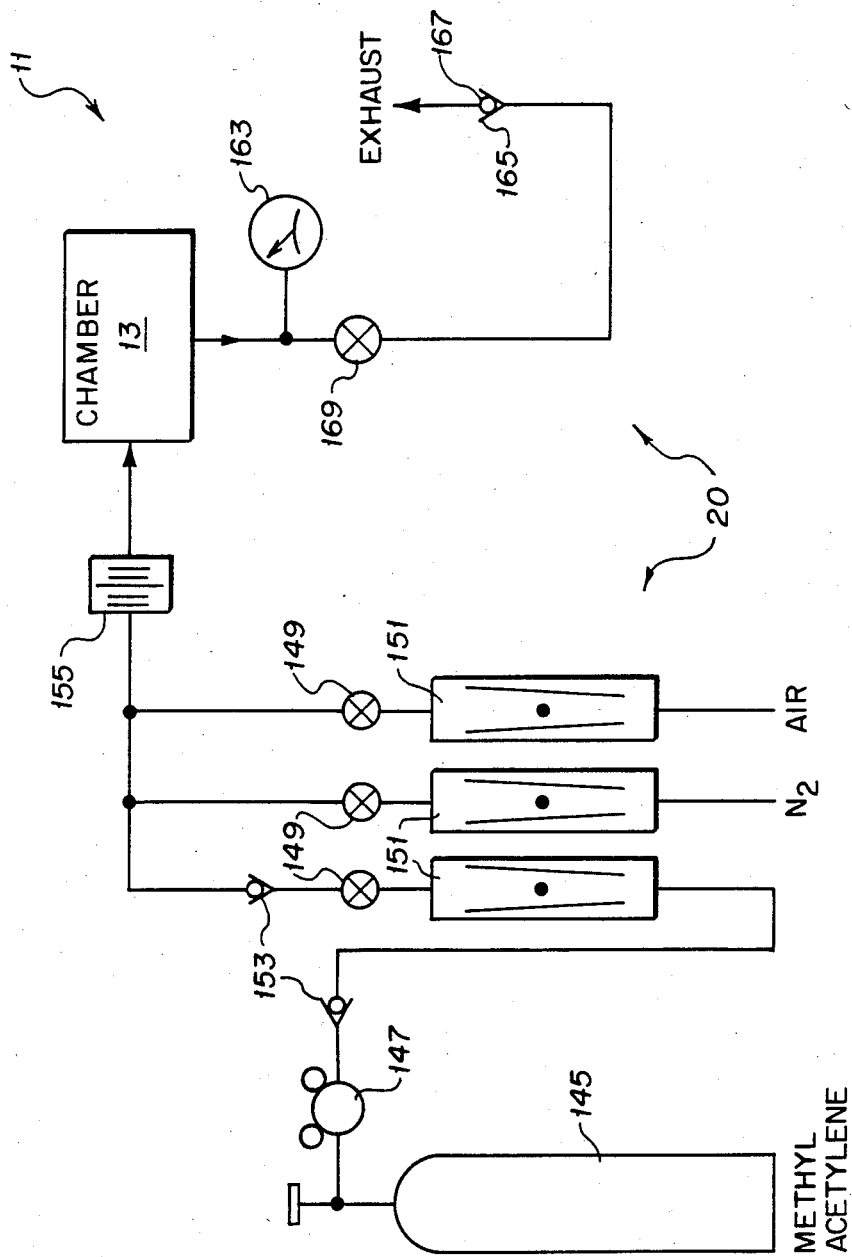
FIG. 2 is a schematic illustration of the splicer of FIG. 1 shown in relation to a gas handling system in accordance with the present invention.

A splicer 11 for providing hermetically sealed splices for optical fibers includes a chamber 13, a fiber holder 15, and a laser assembly 17 as shown in FIG. 1. As indicated in FIG. 2, a gas handling system 20 controls the gas content and flow in the chamber 13. Referring again to FIG. 1, a "fixed" cable lead 21 is mounted so that its position is fixed relative to the chamber 13. A "movable" cable lead 23 is mounted so that its position is determined by the setting of an xyz-translation stage 25 which is arranged to move relative to the chamber 13. The chamber 13 and the translation stage 25 are rigidly mounted on a motor driven platform 27, shown in FIG. 3, so that a length of fiber can be uniformly heated by movement relative to a beam generated by a thermal laser 19 of the laser assembly 17, as seen in FIG. 3.

Figure 4A:
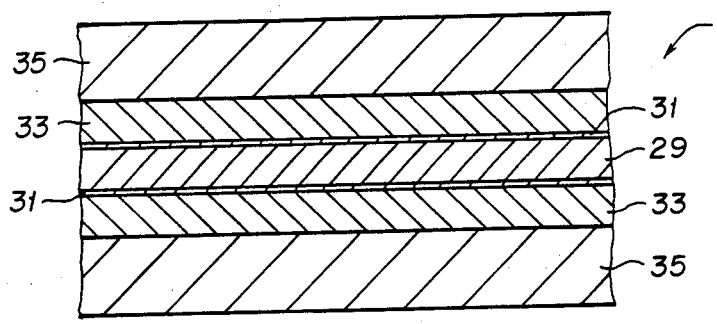
FIGS. 4A–D are cross-sectional views of an optical fiber which illustrate the sequence of operations in accordance with the present invention performed prior to insertion of leads into a reaction chamber.

While many cable and fiber types can be accommodated by the splicer 11, the method of the present invention is explained below in relation to hermetically sealed cables sharing the structure of fixed cable lead 21 as illustrated in FIG. 4A. The illustrated lead 21 includes a 125 $\mu$m diameter multimode optical fiber 29 with a 100 $\mu$m core, an amorphous carbon hermetic coating 31, a silicone buffer layer 33, and a teflon outer jacket 35.

Figure 4B:
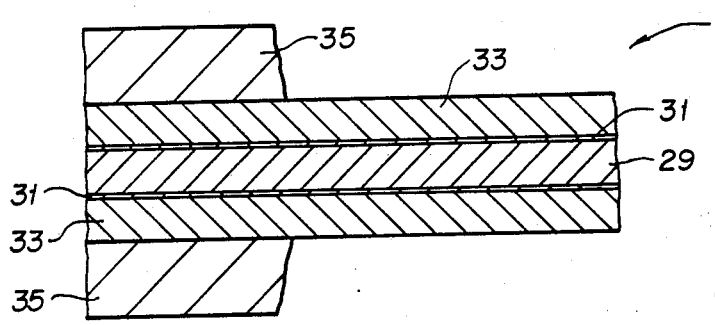
Figure 4C:
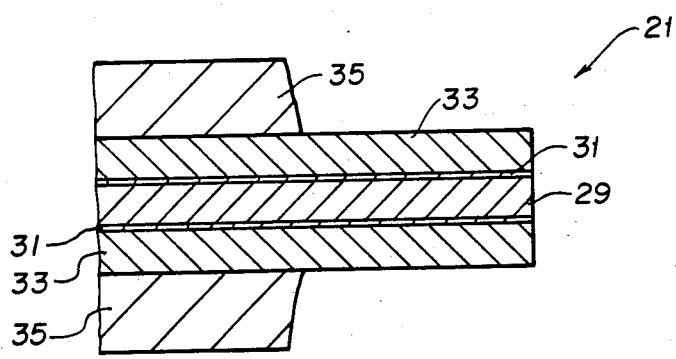
Figure 4D:
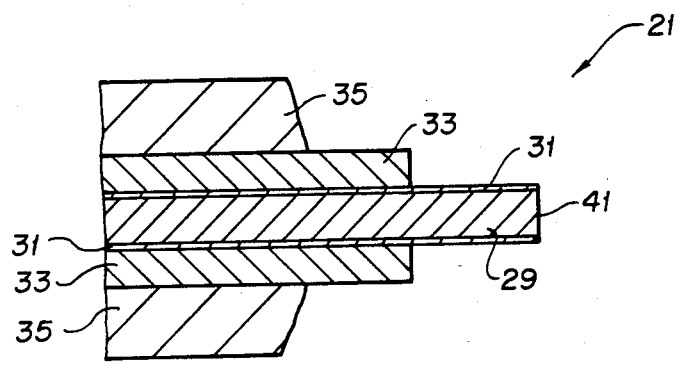
Figure 5A:
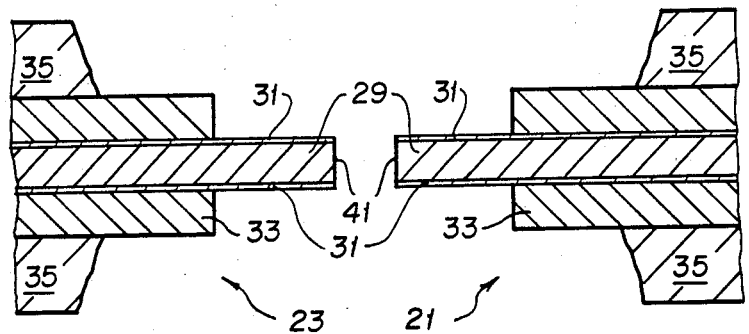
FIGS. 5A–D are cross-sectional views of an optical fiber which illustrate the sequence of operations in accordance with the present invention performed after fiber leads are placed in a reaction chamber and in accordance with the present invention.

Preparation for splicing can include the following steps applied to each cable lead. (1) Each lead is positioned through the fiber holder 15, FIGS. 1 and 2, to minimize post-preparation manipulation. (2) The jacket 35 is stripped back to yield the structure illustrated in FIG. 4B; the lead 21 is then cleaved through the silicone buffer layer 33 to yield the structure illustrated in FIG. 4C; the buffer layer 33 is chemically shrunk to yield the structure illustrated in FIG. 4D; and the cable leads 21 and 23 so prepared are mounted in the holder 15. (3) Each prepared lead is clamped to a respective portion of the fiber holder 15. (4) The fiber holder 15 is slid toward the chamber 13 so that the fiber leads 21 and 23 are positioned therein and the chamber 13 is then sealed. (5) The leads are coaligned, as indicated in FIG. 5A. (6) The laser assembly 17 is used to remove old hermetic coating 31 for about two fiber diameters from each fiber end.

Figure 3:
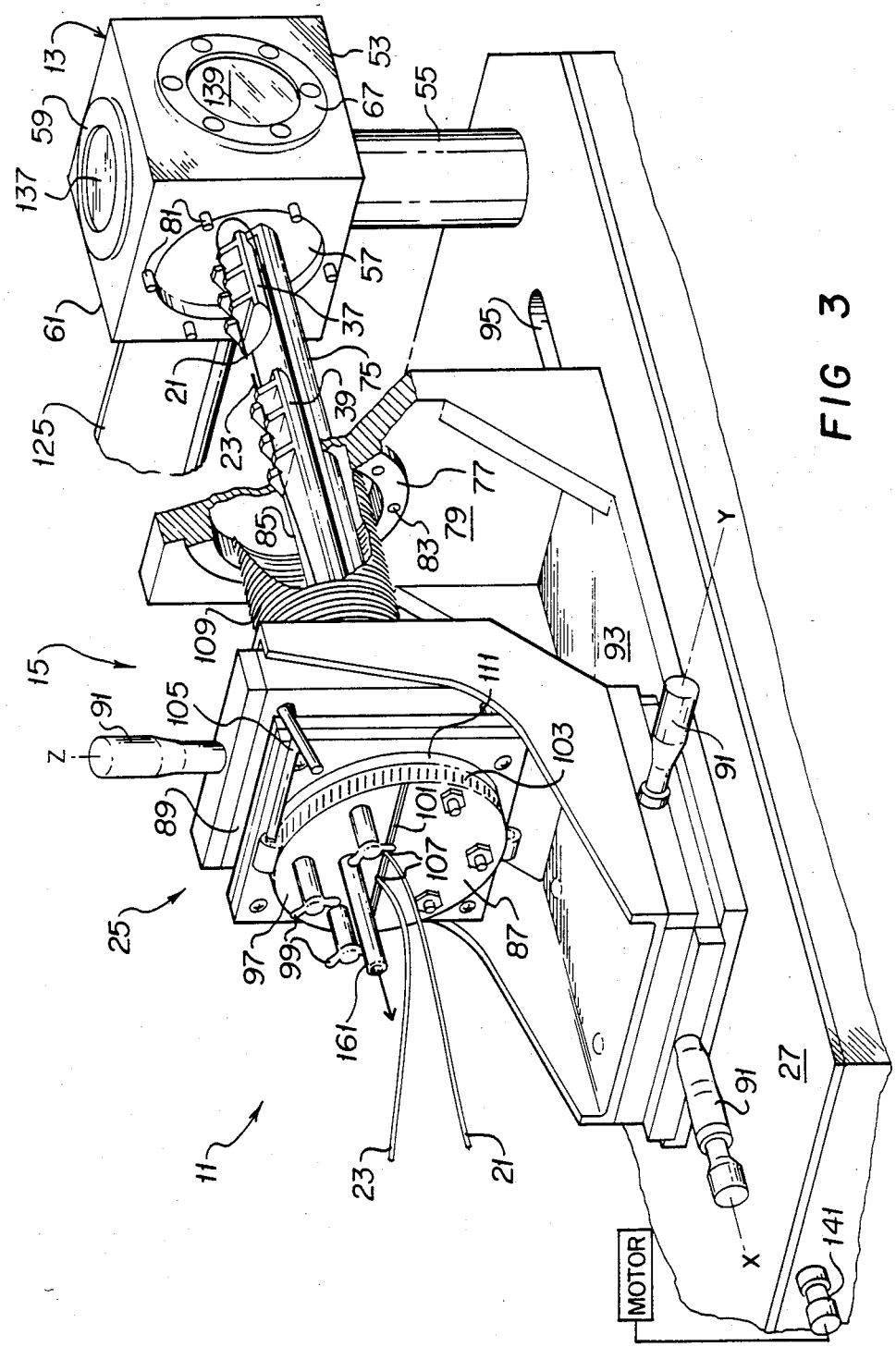
FIG. 3 is a partially cutaway perspective view of a fiber holder shown in relation to a chamber, both being elements of the splicer of FIG. 1.

The leads 21 and 23 are mounted in the holder 15 with a fixed clamp 37 and a movable clamp 39 as shown in FIG. 3. Since the clamps 37 and 37 grip the cable jackets 35, fiber alignment must compensate for any lack of concentricity of the cable jacket 35 and the cable buffer layer 33 with the fiber. In addition, the splicer 11 is designed so that only about 5 mm of the cables are unsupported respective clamps 37 and 39. The protective jacket 35 was stripped for substantially the entire 5 mm supported length of the cables 21, 23, and only 2–3 mm of the unsupported lengths of the cables is not covered by the buffer layer 33. Thus, the ends of the optical fibers 29 are well supported so that self-aligning forces caused by surface tension during the fusion splicing process are not very significant. This allows off-center cores to be precisely aligned to optimize the optical performance at the splice.

Figure 5B:
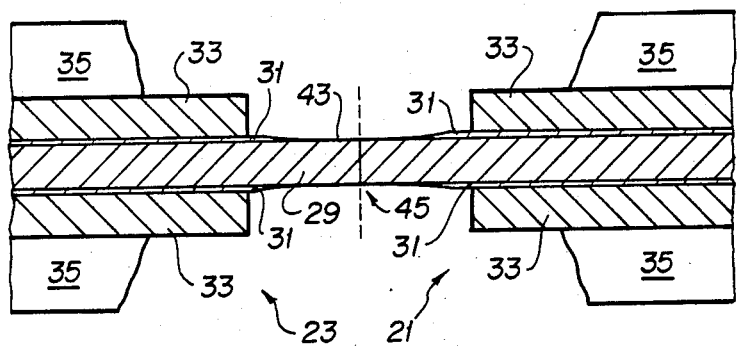

The actual splicing operation involves the following steps. (7) In a "prefuse" step, the thermal laser 19 is used to shape and clean the fiber end faces 41. (8) The fiber end faces 41 are butted and spliced using the thermal laser 19, yielding a spliced fiber 43 with a splice location 45, as indicated in FIG. 5B. (9) In a "postfuse" step, the spliced fiber 43 is reheated along a short length about the splice location 45 to fuse any particulate material, ejected from the splice location 45 during the fusion step, back into the spliced fiber 43.

Figure 5C:
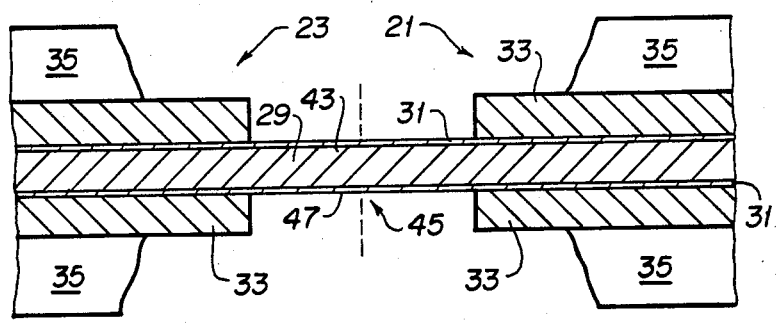

The desired hermetic coating is applied as follows. (10) Reactant gas is introduced into the chamber 13. (11) The spliced fiber 43 is heated so that a hermetic coating 47 forms over the exposed fiber 43, as indicated in FIG. 5C. (12) The reactant gas is purged.

Figure 5D:
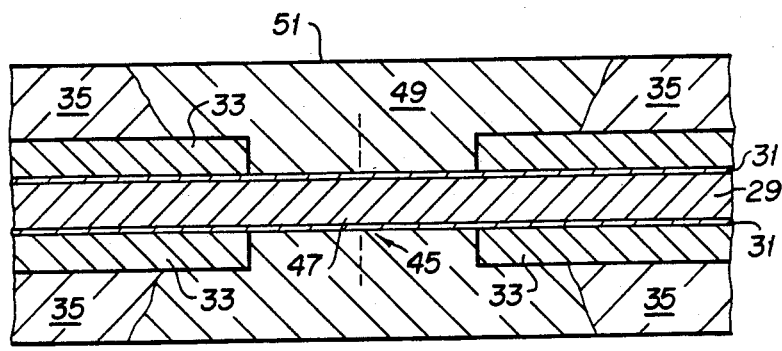

The procedure can be concluded as follows. (13) The chamber 13 is opened and the fiber holder 15 separated from the chamber 13 so that a protective buffer 49 can be applied over the splice location 45, as indicated in FIG. 5D. In addition, the completed cable 51 can be mechanically and optically tested and characterized.

Characterizing the illustrated splicer 11 in greater detail, the chamber 13 is basically cubical, with a bottom face 53 of its six faces being arranged for mounting via a column 55 to the motor driven platform 27, as shown in FIG. 3. The other five faces of the cube are available as vacuum ports. A "positioning" port 57 is used for loading the leads 21 and 23, and their associated mounting hardware into the chamber 13.

As best seen in FIG. 1, a view port 59 is used for viewing and alignment operations, while a "laser" port 61 is used for admitting laser beams into the chamber 13. A "mirror control" port 63, FIG. 6, supports a flip-down mirror 65, FIG. 7, used for vertical alignment of the fiber leads 21 and 23. A "laser alignment" port 67 provides additional access to the interior of the chamber 13 for calibrating the alignment of the laser assembly 17 as described below. The illustrated gas chamber 13 is a stainless steel cube and is 2.75 inches on a side.

The fiber holder 15 is designed to hold both fiber leads 21 and 23 and allow relative movement between there supported ends. The fiber holder 15 includes the fixed clamp 37 and the movable clamp 39 for holding the respective fiber leads 21 and 23 in position. Each clamp includes a base 69, a top 71 and a clip 73 for holding the respective top 71 and base 69 together once the respective fiber lead 21, 23 is in position, as shown in FIG. 8.

Figure 8:
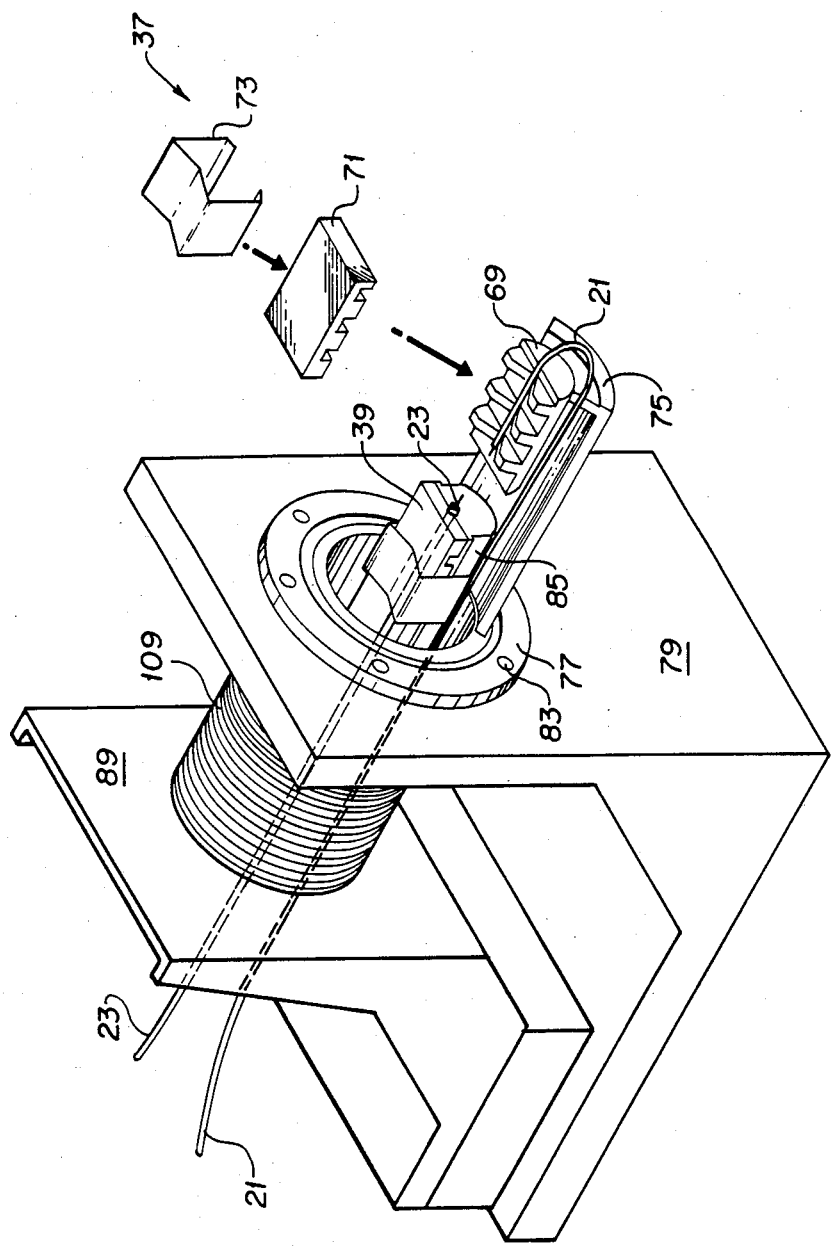
FIG. 8 is a perspective view of parts of the fiber holder of FIG. 5.

The base 69 of the fixed clamp 37 is attached to a cantilever 75 having an arcuate cross section, as shown in FIG. 8. This cantilever 75 is attached to a base bracket flange 77 of a base bracket 79. After the fixed lead 21 is mounted in the fixed clamp 37, the base bracket flange 77 is attached by nuts (not shown) to studs 81, FIG. 3, extending from the chamber 13 through holes 83 in the base bracket flange 77. Thus, the optical fiber 29 of the fixed lead, which is mounted in the fixed clamp 37, is rigidly disposed with respect to the chamber 13. Both leads 21 and 23 extend through the positioning port 57 and the fixed lead 21 is looped around within the chamber 13 so that, after splicing, the spliced fiber 43 can be readily removed from the chamber 13.

The movable clamp 39 is mounted on a semi-cylindrical rod 85 which conforms to the arcuate cantilever 75 on which the fixed clamp 37 is mounted. The semi-cylindrical rod 85 is attached to a bottom semi-circular face plate 87, FIG. 3, bolted to a translation stage bracket 89 of the translation stage 25. Thus, the position of the movable lead 23 relative to the fixed lead 21 is controlled by means of the x, y and z micrometer controls 91 of the translation stage 25. For example, the axial separation of the leads 21 and 23 is controlled by the x control, which moves the movable lead 23 longitudinally relative to the fixed lead 21. The y and z controls are used to coalign the leads, in horizontal and vertical directions, respectively.

The base bracket 79 is integral with the translation stage base 93. When the base bracket 79 is not secured to the chamber 13, it can be moved longitudinally relative to the motorized platform 27 and the chamber 13. This movement is constrained to the x dimension by means of a pair of pins (not shown) protruding from the translation stage base 93 and engaging a longitudinally extending slot 95 in the platform 27, as indicated in FIG. 3. This makes it easy to mount the leads 21 and 23 outside the chamber 13.

The mounted leads 21 and 23 then can be positioned by sliding the base bracket 79 and the translation stage 25 along the elongated slot 95 toward the chamber 13. This arrangement also allows the spliced fiber 43 to be separated from the chamber 13 without contacting the splice prior to molding a protective buffer 49 over the splice location 45 before the spliced fiber 43 is removed from the clamps 37 and 39.

A top semicircular face plate 97, FIG. 3, or "half-moon seal", is attached using thumb screws 99 for easy removal while introducing leads and removing spliced fibers. Neoprene rubber inserts 101 attached to the respective face plates 87 and 97 engage each other and provide a sealed port for leads 21 and 23 to extend through.

The mutual pressure of the neoprene inserts 101 is adjusted by means of a ring clamp 103 which can be tightened by rotating a T-shaped adjustment tool 105. Each neoprene insert 101 includes two semicircular slots 107 for accommodating the two leads 21 and 23. Silicon grease can be applied to enhance the seal at the slots 107.

A stainless steel bellows 109 extends between a translation stage flange 111 on the translations stage bracket 89 and the base bracket flange 77. The bellows 109 completes the seal at the positioning port 57 while allowing 3-axis movement of the translation stage 25 relative to the chamber 13.

Figure 9:
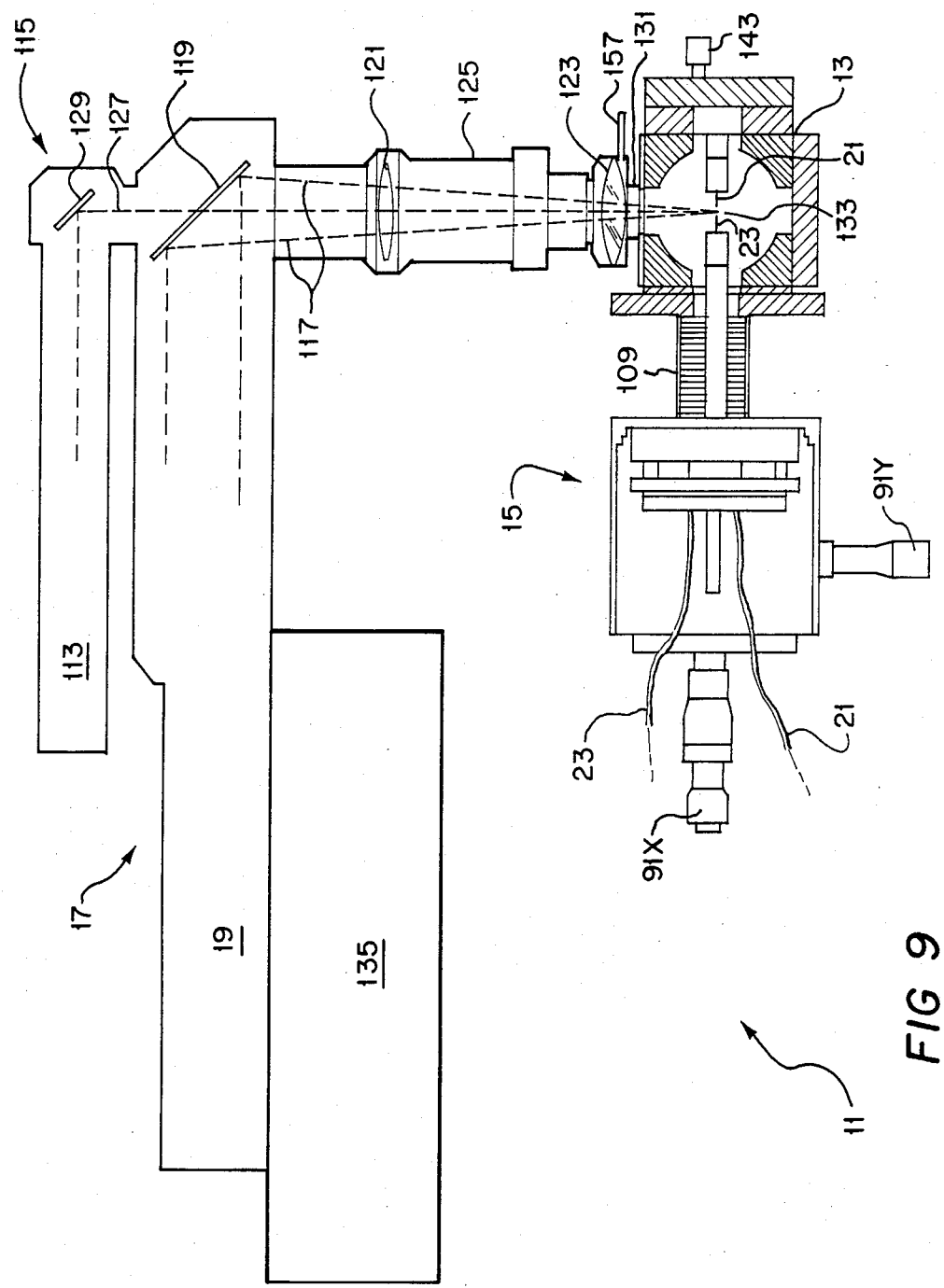
FIG. 9 is a partially sectional and partially schematic view of the splicer of FIG. 1.

The laser assembly 17 includes a thermal laser 19, a marking laser 113 and an optical beam delivery subassembly 115, as shown in FIG. 9. The thermal laser 19 generates a thermal beam 117, which is reflected off a thermal beam mirror 119 toward the chamber 13, as illustrated in FIG. 9. The beam delivery subassembly 115 includes a focusing system with a fixed lens 121 and a foousing lens 123, the latter being movable by rotating a barrel 125. The marking laser 113 generates a visible marking beam 127, which is reflected by a marking beam mirror 129 and which passes through a hole in the thermal beam mirror 119 along a path which is coaxial with the path of thermal beam 117.

The laser port 61 is used for entry of the laser beams 117 and 127 into the chamber 13, FIG. 9. Because the end of the beam delivery subassembly 115 is sealed with the focussing lens 123, the need for an additional infrared window is avoided by sealing the beam delivery system directly to the laser port 61. This is done using a thin rubber tube 131 stretched between the laser port 61 and the lens barrel 125. This tube 131 allows relative movement between the laser beam and the chamber containing the fibers to be spliced.

At the output of the delivery system is a lens, which in the present embodiment has a 2.5 inch focal length. The beam delivery subassembly 115 is adjusted so that the focus of the thermal laser 19 is beyond the axes of the leads and has a beam diameter of about 0.7 to 0.8 mm at the leads. The reason for the positioning of the leads 21 and 23 between the focussing lens 123 and the focal point 133 of the thermal beam 117 is to ensure that fiber material intercepts the thermal beam 117 before the focal point 133. Otherwise, the laser might be able to initiate the homogenous reaction for the gas due to the very high intensity at the focal point.

The thermal laser 19 is a carbon dioxide ($CO_2$) laser which emits infrared light which can be used to heat the fused silica optical fiber and other materials associated with fiber optical cables. The thermal laser includes a heat sink module 135 to dissipate the considerable heat generated during lasing.

The laser assembly 17 is adjustable in three dimensions by means well know to those skilled in the art so that the point of focus of the laser beams 117 and 127 can be precisely positioned with respect to the leads 21 and 23, as shown in FIG. 9. The lens barrel 125 is connected to the chamber 13 through the flexible tube 131 so that the beam delivery subassembly 115 can be aligned relative to the leads. The desired focus is obtained while observing through the quartz window 137 over the view port 59 the marking beam spot relative to the leads 21 and 23.

The y-axis adjustment, in the direction of the thermal beam 117, is used to adjust the focal point of the thermal beam 117 and thus the spot size at the leads 21 and 23 and is not moved after determining all of the process parameters. The z-axis vertical adjustment is set so that the leads 21 and 23 are in the laser beam path. The x-axis adjustment is used to translate the fiber so that the laser can be targeted anywhere along the length of the leads 21 and 23 or the spliced fiber 43.

The thermal laser 19 has a 1.7 mm diameter beam with a nominal power of 5 watts. The amount of laser power used is determined empirically because each thermal laser's power can be different and vary with age.

The thermal laser output can be modulated at up to ten kilohertz. The average power of the thermal laser 19 can be controlled by varying the duty cycle of a fixed frequency square or rectangular wave signal. For example, the power of a 400 Hz signal can be varied by adjusting duty cycle between 8% and 89%. In the illustrated embodiment, a frequency of 400 Hz was chosen because it is a convenient frequency that is considerably faster than the thermal time constant of the fiber.

The output can be controlled by a foot switch (gate mode) or by specifying a number of pulses (burst mode). In the burst mode, the duration of the train of laser pulses is usually specified to be in the range from a half second to one and a half seconds.

The thermal and marking lasers 117 and 127 are coaligned to have a common focal point 133. This alignment can be checked by removing the covering 139, FIG. 7, of the laser alignment port 67 and aligning a target with the marking beam 127, FIG. 9, and then burning a hole in the aligned target using the thermal beam 117 and comparing the location of the burn and the point at which the marking beam 127 was focussed. A control, not shown, is provided for relatively aligning the marking beam and the thermal beam 117.

While reapplying the hermetic coating the chamber 13 must move back and forth a few millimeters along the x-axis shown in FIG. 3. This can be accomplished by operating an automated stepper micrometer 141 which drives the platform 27 upon which the chamber 13 and the translation stage 25 are mounted while the thermal laser 19 is on. This permits the spliced fiber 43 to be swept perpendicular to the thermal beam 117 at a fixed speed.

The view port 59 is used for laser alignment using the marking beam 127 and for relatively positioning the leads 21 and 23. It is sealed by a quartz window which is thick enough to absorb thermal laser radiation. Alignment of the leads is critical since the fiber cores must be precisely aligned to minimize light loss at the splice. Transverse alignment can be effected while viewing the leads 21 and 23 from above through a microscope. A 10X - 70X stereo zoom microscope can be advantageously employed.

Figure 7:
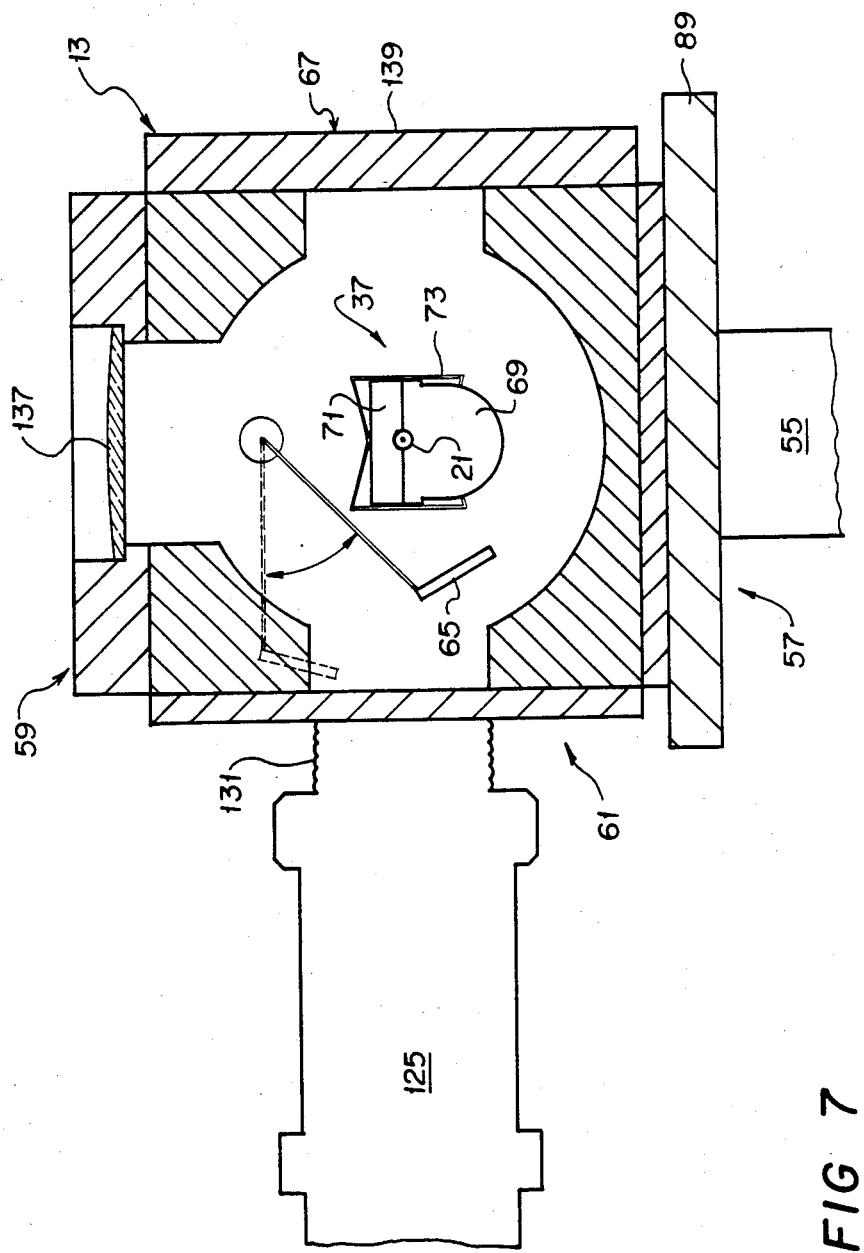
FIG. 7 is a cross-sectional view of a chamber of the splicer of FIG. 1 showing a pivotable mirror.

Vertical alignment, controlled by the z control of the translation stage 25, is effected while viewing the reflection of the pair of leads in the 45° flip-down mirror 65, FIG. 7, pivoted into position. In its active position, the flip-down mirror 65 acts as a stop for the laser beams and permits accurate vertical alignment based on visual feedback through the view port 59. The flip-down mirror 65 is rigidly connected to the mirror control knob 143, FIG. 9, mounted at the mirror control port 63.

In order to form a hermetic or other coating on a newly spliced fiber, the gas content of the chamber 13 must be controlled. The gas handling system 20, shown in FIG. 2, includes sources of the required gases. In the present embodiment, nitrogen and air sources are provided from available taps. The gas used to deposit a carbon hermetic seal over the spliced fiber 43, is provided from a pressurized tank 145. Flow from the tank 145 is limited by a regulator 147.

Control valves 149 and associated rotameters 151 are used to afford precise control of the respective flow rates of the available gases. Two check valves 153 are used to prevent backflow and contamination along the path from the tank 145. A filter 155 is included in a mutual line to remove particulate contaminates. For example, in the illustrated embodiment, the filter 155 implements a 0.01 $\mu$m pore size.

Figure 6:
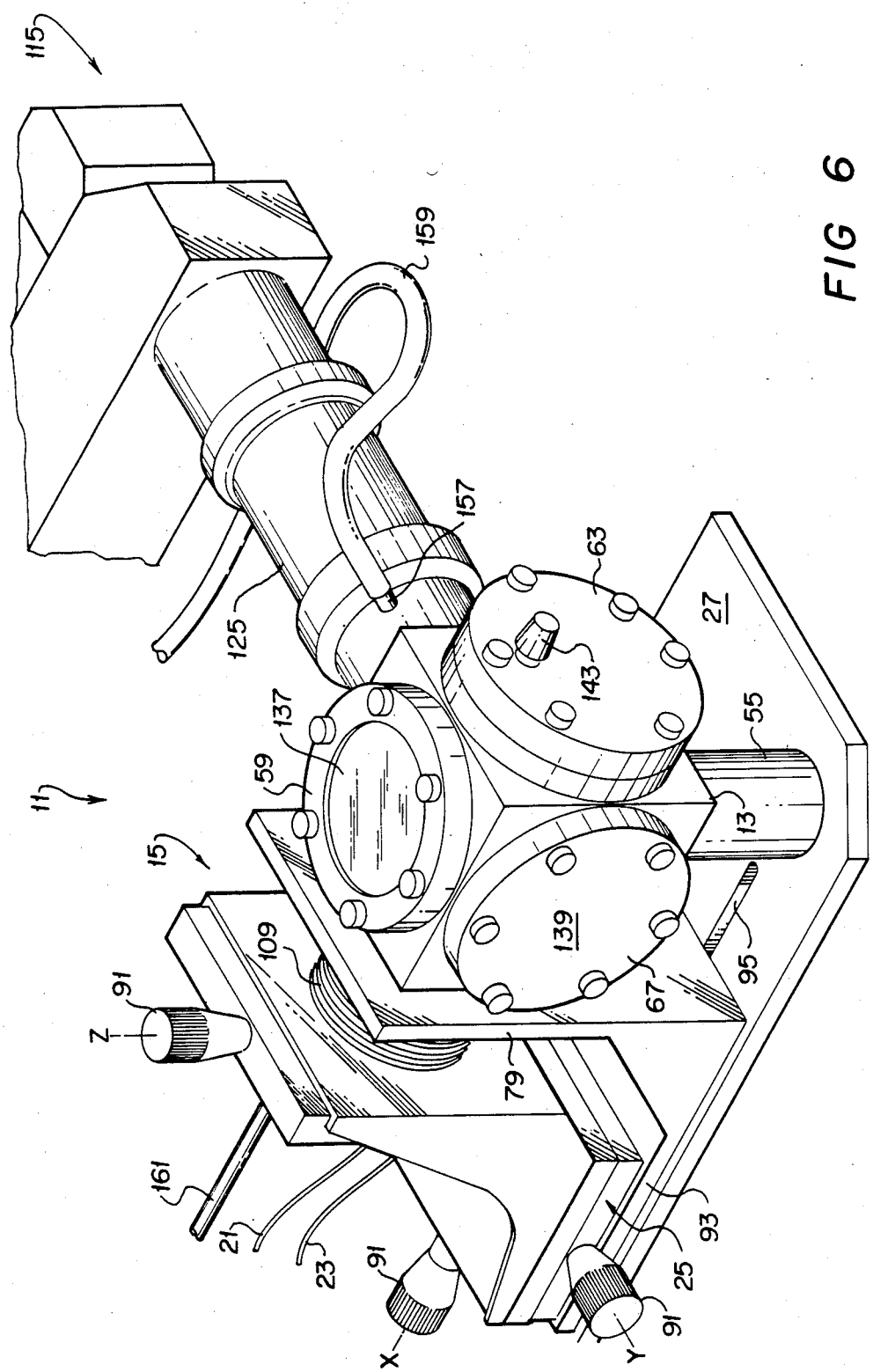
FIG. 6 is another perspective view of the splicer of FIG. 1.

The inlet to the chamber 13 includes a short metal tube 157 which extends through the end of the lens barrel 125, as shown in FIG. 6. The chamber gases are introduced at the focussing lens 123, so that contaminants are continuously purged therefrom. Communication between the filter 155 and the inlet tube 157 is via a conventional gas flow tube 159.

The gases exhaust the chamber 13 through an outlet tube 161 through the top semi-circular plate 97 on the translation stage bracket 89, as best shown in FIG. 3. From there the gases are vented to the house exhaust. The pressure gauge 163, FIG. 2, is used to monitor for gas leakage from the chamber 13 before the commencement of the splicing process. This is done by slightly pressurizing the chamber 13, closing all valves, and observing whether the chamber pressure remains stable, as indicated by gauge 163.

A check valve 165 on the outlet of the chamber 13 has its spring removed and is kept in a vertical position. The resulting weight of the ball 167 in the outlet check valve 165 maintains the pressure in the chamber 13 at about 1.3 atmospheres. This slight overpressure ensures that, if a leak occurs, reactants leak out instead of air leaking into the chamber 13. The exhaust from the chamber 13 is controlled by an outlet control valve 169.

The method of the present invention can be implemented as follows. First, with reference to FIG. 3, the top semi-circular face plate 97 is removed, and several feet of both leads 21 and 23 to be spliced are inserted through the bellows 109. This is done prior to preparing the lead ends to minimize chances of scratching the lead ends after preparation.

Second, the ends of the cable leads are prepared. The illustrated cables have a silicone buffer layer 33 and a teflon jacket 35, as shown in FIG. 4A. The teflon jacket is removed without damaging the silicone by using a microstrip tool, yielding the structure of FIG. 4B. The lead 21 is then cleaved through the buffer layer 33, yielding the structure of FIG. 4C. The buffer layer is then shrunk back 1.5 to 2 mm from the fiber end by immersing it in an ultrasonic bath of trichlorothane (TCA), yielding the structure of FIG. 4D. The result is a very clean exposed fiber, free of cleavage marks, as required for a high-strength, low-loss splice.

Third, the prepared ends are mounted in the clamps 37 and 39. Slack in the leads is removed by pulling back through the bellows 109. The top semi-circular face plate is then installed and sealed by the thumb screws 99 and ring clamp 103.

Fourth, the fiber holder 15 is slid into the chamber 13, which is then sealed. The process of sealing the leads 21 and 23 within the chamber 13 adds only a couple of minutes to the time required to perform a conventional splice. In the present splicer 11, the leads enter the cubical chamber 13 from one side. Thus, the fixed lead 21 must loop around, as indicated in FIG. 8, within the chamber 13. After the chamber 13 is sealed, it is checked for gross leaks by pressurizing to 1.3 atmospheres and using the pressure gauge 163, FIG. 2, to determine whether the slight excess pressure is maintained.

Fifth, the leads 21 and 23 are aligned. Using the 10×-70× stereo zoom microscope and the flip-down mirror 65, the leads 21 and 23 can be aligned visually from two perpendicular axes. Preferably, the leads are spaced about one fiber diameter apart. An on-line optical time-delay reflection device connected to the free end of one of the leads can be used to fine tune the alignment by minimizing optical loss.

Sixth, the existing hermetic coating 31 is removed for about 250 μm from each lead end face 41. Using the thermal laser 19, the leads are heated to several hundred degrees Celsius in an air and nitrogen mixture so that the carbon is oxidized and removed near the lead ends. During other processing steps, the fibers get hotter and the coating is further removed. By removing some of the coating at this time, the selection of the power setting for the next, prefuse, step is not complicated by the changing temperature of the fiber ends while the hermetic coating is burned away due to differences in laser energy absorption of coated and non-coated fiber.

The power setting is chosen so that just enough power is available to begin removing the coating in 5-15 seconds and to complete it in 15-30 seconds. This low setting is preferred to minimize the overall time that the leads are heated to a temperature high enough to soften and sag under their own weight. An appropriate nitrogen and air mixture flow for this step was selected with the nitrogen flow being 220 cc/min and the air flow being 200 cc/min. This mixture and flow is maintained for the next three steps.

Seventh, in a prefuse step, the lead ends are shaped for splicing. This step ensures that end faces 41 are slightly rounded, to prevent air from being trapped during fusion. The power level for the laser burst can be chosen to be 70% of the power for which significant rounding of the fiber edges occurs. For example, the thermal laser 19 can be operated at 60% power in burst mode for 0.5 seconds, producing 200 bursts at 400 Hz.

Eighth, the leads 21 and 23 are spliced. In a conventional arc fusion splice, fiber ends are placed in contact, heated for about 1.5 seconds, and then pushed together. Because of the precise power control of the thermal laser 19, the fusion splice is performed in two substeps. First, the thermal laser 19 is set to a power, e.g. 47%, that just softens the glass. Using a foot pedal, the thermal laser is switched on and the leads 21 and 23 are moved together. This step may take 5-10 seconds. While the laser is on, the fiber alignment can be fine tuned with the aid of the OTDR. In the second substep, a 1.5 second, high power, e.g. 75%, burst mode is used to ensure sufficient melting and stress annealing of the joint. The result is a spliced fiber 43 with a splice location 45, as shown in FIG. 5B.

Ninth, in a postfuse step, fiber "dust" is fused into the surface of the spliced fiber 43. The postfuse step is required to achieve high-strength (>250 kpsi) splices with adequate yield. The theory is that during the fusion process, $SiO_2$ is evaporated from and condensed onto the surface of the spliced fiber 43. The condensed particles, located three to five fiber diameters from the fusion splice, are stress risers which weaken the splice joint. The power, e.g. 60%, is chosen to achieve dull white glow of the hot fiber. The thermal laser 19 is switched on while the spliced fiber 43 is swept past the thermal beam at a rate of 1.0 mm/s, first in one direction, and then in the opposite direction.

Tenth, the reactant gas is introduced into the reaction chamber 13. The carbon yielding reaction is the pyrolysis of methyl acetylene in a non-oxidizing environment. To ensure a uniform coating of the fiber, the rate of growth of the coating 47 needs be controlled. Since the thermal beam 117 hits only one side of the spliced fiber 43, a slight temperature asymmetry occurs. In an alternative embodiment, the laser beam is split and the resulting components reflected so as to heat the fiber more uniformly.

One way to limit the reaction rate and uniformly deposit the coating is to make the reaction diffusion limited (as opposed to thermally limited). This can be accomplished by reducing the concentration of methyl acetylene in the chamber using a carrier gas such as nitrogen. The gas flows can be 77 cc/min of methyl acetylene and 220 cc/min of nitrogen.

Eleventh, the new hermetic coating 47 is applied over the splice region, yielding the structure of FIG. 5C. By heating the spliced fiber 43 sufficiently, the reduction of methyl acetylene on the surface of the fiber begins. The heat applied during the fourth through seventh steps above can have removed the original carbon coatings for one to two millimeters along the respeective leads. Since the thermal beam width is too narrow to uniformly heat this much fiber, the spliced fiber 43 is swept past the thermal beam 117 at 0.7 mm/s during the recoating process. Fortunately, carbon coating absorbs laser radiation less readily than $SiO_2$ so the spliced fiber 43 becomes cooler for a given laser power as the carbon coating 47 becomes thicker. In other words, the recoating process is somewhat self-limiting.

While recoating the spliced fiber 43, the interface between the original and new coatings disappears when the new carbon coating 47 becomes as thick as the original ooatings 31 and completely overlaps them. This condition is obtained with one pass of the thermal beam 117. For good measure, a total of three passes are preferred. Since the process is self limiting, the deposition rate is significantly reduced for the second and third passes.

Twelfth, the reactant gas is purged from the chamber 13. The nitrogen/air mixture and flow used in the fusion step can be used to purge the reactant gas. The chamber 13 is preferably purged for about four minutes before being opened.

Thirteenth, the chamber 13 is opened and a protective buffer 49 is applied to the splice region, yielding the structure of FIG. 5D. After opening the chamber 13, the fiber holder 15 is withdrawn and the bottom of a conventional clam shell silicone "buffer recoat" mold (not shown) is carefully positioned under the splice location 45.

To facilitate the placement of the mold about the coated fiber 43, the mold is mounted on an xyz-translation stage, not shown. The molding takes place with the fiber holder 15 retracted along its track slot 95 from the chamber 13. A mold support is thermally isolated from fiber holder's translation stage 25 and the chamber 13. The mold support has a thermostatically controlled heater. The thermostat consists of a normally closed switch that opens when its temperature reaches about 102° C.

One drop of premixed RTV silicone (General Electric GE670) is placed on the mold next to the spliced and coated fiber 43. After the silicone has flowed under the fiber 43, the top of the mold is closed. The mold has a hole that is the same size as the fiber's teflon jacket 35, in this case 670 μm. When a five minute thermal heat cycle is complete, the mold is split and the spliced and coated cable removed.

Preferably, the new buffer 49 has a higher modulus than the original buffer layers 33 to provide stiffness at the splice location comparable to the stiffness of the original soft silicone buffer and teflon outer jacket combined. This additional stiffness can help protect the splice location 45 from excessive bends without requiring the molding of a Teflon outer jacket. GE670 silicone, a premixed RTV silicone, selected as the material for the new buffer 49, has a higher modulus than the GE615 silicone used for the original buffer layers 33.

Comparisons were made between a splice made in accordance with the inventive method with a conventional splice of the same cable type, i.e., with the same fiber, buffer and jacket. Using a mandrel test procedure, splices formed conventionally and according to the present invention were respectively placed under a strain of 1.3% and immersed in a bath of concentrated (49%) hydrofluoric acid. The conventional splices broke within five minutes under these conditions. The splices formed according to the method detailed below remained intact for six months, at which time the tests were terminated. This test demonstrates the dramatic improvement in splicing technology provided by the present invention.

Pursuant to the foregoing, the present invention provides for a method and apparatus for hermetic splicing. The apparatus is designed so that the leads and spliced fiber undergo minimal disturbance and exposure to contaminants during splicing. The completed splice is comparable to the original cables optically, mechanically, and physically. Thus, the present invention provides for the economical manufacture of very long hermetically sealed optical cables, suitable, for example, for transoceanic communications.

In addition to the embodiments described and suggested above, the present invention provides for a wide range of alternative embodiments. The cable or fiber to be spliced can vary in several respects from the illustrated cable. The fiber can have different dimensions and optical profiles. The original fiber can have a different original hermetic coating, or none at all. The outer layers of the cable can be varied in a number of respects.

The hermetic coating described above is amorphous carbon. Other coating materials can be used to achieve a hermetically sealed optical cable. Furthermore, the invention provides for other coatings to achieve other characteristics. For example, the coating can be used to exclude extraneous light from the fiber. A conductive coating could be applied to provide an electrical path coextensive with the optical path of the fiber; this arrangement could be used to deliver power by means of the coating while using the fiber for detection. In such a case, a different reactant gas would be chosen. Furthermore, the invention can be adapted to apply successive coatings over the splice.

Many other pre-splice sequences are provided for. Obviously, where the initial leads are unprotected fibers, preparatory steps would be eliminated or modified. Different outer structures would be handled in appropriately different ways.

Alternative splicing apparatus are provided for. The chamber could be designed with as few as one port, or with more than five ports. The various heat-requiring steps need not all use the same heat source. The heat source need not be a laser. An alternative means for locally heating the desired lengths of fiber could be used. The leads need not extend through the same port. For example, the chamber could be disassembled to free the spliced fiber from the chamber.

The mechanical arrangement of the fiber holder could be altered in a number of ways. Both clamps could be movable relative to the chamber. Furthermore the relative movement between the fibers and the heat source could be effected by moving the chamber, or the laser source, or a fiber holder movable relative to the chamber. In order for a length of fiber to be heated, the beam of the laser could be redirected gradually, instead of being held stationary while the fiber is moved using a stepper micrometer.

These and other modifications and variations are provided for by the present invention, the scope of which is limited only by the following claims.

What is claimed is:

1. A splicing apparatus comprising:
   alignment means for holding two fiber leads in opposition within spatial region and axially coaligning said leads, said alignment means being adjustable to control the separation of said leads;
   fusion means for fusing said leads together to form a spliced fiber;
   heating means for heating a splice-including segment of a spliced fiber relative to a surrounding gas;
   a reactant gas source;
   another gas source; and
   gas flow means for introduction of gas into said spatial region, evacuation of gas from said spatial region, and for mixing of gases prior to introduction into said spatial region, said gas flow means being in communication with said gas sources, said gas flow means including controls for controlling the flow of gases from each of said source to said spatial region.

2. The apparatus of claim 1 further comprising a chamber defining said spatial region.

3. The apparatus of claim 2 further characterized in that said heating means includes a laser source for delivering a thermal laser beam into said chamber, said beam having a focus within said chamber, said focus being adjustable, said heating means also including motorized means for moving said chamber with respect to said laser means so that a longitudinal extent of fiber can be heated by exposure to said laser beam.

4. The apparatus of claim 2 wherein said alignment means includes a fixed holder and a movable holder, means for rigidly fixing said fixed holder with respect to said chamber, and fiber alignment means for moving said movable holder relative to said chamber so that said fiber leads can be aligned.

5. The apparatus of claim 2 further characterized in that said alternative gas source includes a source gas which is relatively inert when heated.

6. The apparatus of claim 5 further comprising a third gas source for providing an oxygen-bearing gas.

7. The apparatus of claim 2 further comprising sealing means for sealing said chamber so that the pressure inside said chamber can be different from the pressure outside said chamber.

8. A splicer for optical fibers comprising:
a splicing chamber, said chamber having a first port for receiving first and second fiber leads;
a translation stage arranged for three-dimensional movement relative to said chamber;
first holder means for positioning a first fiber lead within said chamber and at a fixed position relative to said chamber;
second holder means for positioning a second fiber lead within said chamber so that the end of said second fiber lead is in opposition to the end of said first fiber lead, said second holder means being rigidly disposed relative to said translation stage so that said fiber leads can be coaligned and controllably spaced by operation of said translation stage;
thermal laser means for delivering a laser beam capable of significantly heating an optical fiber, said thermal laser means including means for bringing a laser beam to a focus within said chamber;
laser alignment means for moving said laser relative to said chamber so that the focus of said thermal laser can be positioned with respect to said fiber leads, said laser alignment means including motorized means for moving fiber leads positioned by said first and second holding means longitudinally of said fiber leads with respect to the focus of said thermal laser means;
a reactant gas source for supplying reactant gas;
alternative gas source means for supplying gases other than said reactant gas;
gas handling means in communication with said reactant and alternative gas sources and said chamber for selectively mixing gases from said sources, selectively introducing gas mixtures into said chamber, and evacuating gases from said chamber;
sealing means for sealing said chamber so that gases introduced by said gas handling means can flow through said chamber under a pressure different from the ambient pressure external to said chamber; and
means for concurrently activating said thermal laser source and said motorized means of said laser alignment means so that said fiber leads can be heated along lengths thereof, and so that a length of spliced fiber can be hermetically sealed along a length being translated with respect to the thermal laser beam of said thermal laser source while surrounded by flowing reactant gas introduced from said reactant gas source via said gas handling means.

9. The splicer of claim 8 further comprising marking laser means for delivering a laser beam capable of rendering a visible mark on an optical fiber, said marking laser delivering a beam coaxial of the beam path of said thermal laser means so that the beam of said marking laser means serves as an alignment indicator for said thermal laser means.

10. The splicer of claim 8 further comprising a mirror, said chamber including a window through which said leads can be viewed, said mirror being positioned to provide an additional perspective on said leads through said window so that lead alignment can be readily observed from more than one direction.

11. The splicer of claim 10 wherein said mirror is pivotable between first and second positions so that when said mirror is in said first position the reflection in said mirror can be seen through said window, said mirror in said first position serving to block any thermal laser beam from said leads, said mirror being arranged so that in said second position a thermal laser beam is not blocked from said fiber leads.

12. A method of providing a coated spliced optical fiber comprising the steps of:
aligning two fiber leads so that their ends are opposed;
fusing the two ends together so as to define a spliced fiber with a splice location, said fiber defining a longitudinal direction;
surrounding a segment of said spliced fiber including said splice location with a reactant gas capable of coating a heated optical fiber; and
heating said spliced fiber so as to cause a coating to form on said segment.

13. The method of claim 12 further comprising a step of mounting the two fiber leads in respective holders which are movable relative to each other, and positioning said holders within a sealable chamber, said surrounding step including a substep of flowing reactant gas through said chamber by introducing reactant gas at a chamber inlet and evacuating reactant gas at a chamber outlet while said chamber is sealed other than at said inlet and said outlet.

14. The method of claim 13 wherein said reactant gas is mixed with a non-reactant gas prior to introduction to said chamber so that coating formation is diffusion limited.

15. The method of claim 12 wherein said heating step is effected by moving the spliced fiber longitudinally through a generally transversely directed thermal laser beam.

16. The method of claim 15 wherein said movement of said spliced fiber relative to said laser beam is effected by moving said chamber relative to said laser beam by means of a motorized micrometer control of a platform on which said chamber is mounted.

17. The method of claim 12 further comprising a step of, after said fiber alignment step and before said fusion step, heating the end of each fiber so that each end assumes a slightly convex form.

18. The method of claim 12 further comprising a step of, after said fusion step and before said surrounding step, fusing particulate matter dislodged from said fiber leads during said fusion step which has deposited on the surface of said spliced fiber adjacent said splice location so that said particulate matter becomes integral with the cladding of said spliced fiber.

19. The method of claim 18 further characterized in that said particulate matter fusion step is effected by moving said spliced fiber longitudinally with respect to a generally transversely directed thermal laser beam.

20. The method of claim 12 further characterized in that during said fusion step, the optical alignment of said fiber leads is continually monitored, further adjustments being made to fiber lead alignment as indicated by such monitoring.

21. The method of claim 20 wherein said monitoring is performed using an optical time-delay reflection apparatus coupled to an end of a fiber including one of said fiber leads, the coupled end being different from the end being fused.

22. The method of claim 12 further comprising the step of, prior to said fiber alignment step, for each fiber lead, removing coating material from the cladding for a length equal to at least one cladding diameter from the end of the respective fiber lead.

23. The method of claim 12 wherein said removal step is effected by moving said fiber leads longitudinally through a generally transversely directed thermal laser beam so as to vaporize said coating along the specified lengths.

24. The method of claim 12 further comprising the steps of, prior to said fiber alignment step:
obtaining a pair of fiber cable leads, each lead including an optical fiber, and a buffer layer, in radially outward order;
cleaving one end of each fiber cable lead through said buffer layer; and
for each fiber cable lead, shrinking back said buffer layer so as to expose a length of the respective fiber lead at least equal to twice the outer diameter of the respective cladding.

25. The method of claim 12 further characterized in that said fiber cable lead obtaining step is effected by obtaining fiber cable leads, each lead including an optical fiber, a buffer layer and a protective jacket, in radially outward order, and, for each fiber cable lead, stripping a portion of the respective jacket so as to expose at least three cladding diameters of buffer layer between the respective fiber cable lead end and the remaining portion of the respective protective jacket.

26. The method of claim 12 further comprising the steps of, prior to said fiber alignment step:
obtaining a pair of fiber cable leads, each lead including an optical fiber, a hermetic coating and a buffer layer, in radially outward order;
cleaving one end of each fiber cable lead through said buffer layer; and
for each fiber lead, shrinking back said buffer layer so as to expose a length of the respective fiber lead at least equal to twice the outer diameter of the respective cladding.

27. The method of claim 26 further characterized in that said obtaining step is effected by obtaining fiber cables, each including an optical fiber, a buffer layer, a hermetic coating and a protective jacket, in radially outward order, and, for each fiber cable lead, stripping a portion of the respective jacket so as to expose at least three cladding diameters of buffer layer between the respective fiber cable lead end and the remaining portion of the respective protective jacket.

28. The method of claim 26 further comprising the steps of:
mounting each fiber cable lead in a respective mount;
arranging a first of said mounts inside said chamber so that the position of said first mount is fixed within and relative to said chamber; and
arranging a second of said mounts inside said chamber so that the end of the respective fiber lead is opposite the end of the non-respective fiber lead, said second mount being rigidly connected by mechanical means to a translation stage external to said chamber so that said fiber leads can be aligned with respect to each other by manipulating said translation stage.

29. The method of claim 28 further comprising the step of, prior to said fiber alignment step, for each fiber lead, removing coating material from the cladding for a length equal to at least one cladding diameter form the end of the respective fiber lead.

30. The method of claim 29 wherein said coating removal is effected by moving said fiber leads longitudinally through a generally transversely directed thermal laser beam so as to vaporize said coating along the specified region.

31. The method of claim 30 wherein said reactant gas is diluted by mixing with non-reactant gas prior to introduction to said chamber so that coat formation is diffusion limited.

32. The method of claim 31 wherein said heating step is effected by moving the spliced fiber longitudinally through a generally transversely directed thermal laser beam, said movement being sufficient so that the material added to the spliced fiber overlaps remaining portions of the original hermetic coatings.

33. The method of claim 32 wherein said movement of said spliced fiber relative to said laser beam is effected by moving said chamber relative to said laser beam by means of a motorized micrometer control of a platform to which said chamber is fixed.

34. The method of claim 33 further comprising a step of molding a protective layer over said newly deposited hermetic seal so as to overlap remaining portions of said original hermetic seals and buffer layers.

35. The method of claim 34 further characterized in that said molding step involves selecting a molding material so that the resulting protective layer has a greater modulus than the original buffer layers.

36. The method of claim 35 further characterized in that said molding step provides that said protective layer extends to and between the remaining portions of said protective jackets and extends radially about the same extent as said protective jackets.

37. A method of splicing two optical fiber cable leads, said method comprising the steps of:
locating two longitudinally extending fiber cables, each with a respective lead to be spliced, each fiber cable lead having a generally circular cross section defining a radial direction generally orthogonal to the direction of longitudinal extent of the respective lead at said cross section, each lead having plural longitudinally extending components, including, in radially outward order, an optical fiber, a hermetic seal radially surrounding said fiber, and a buffer radially surrounding said hermetic seal;
for each cable, cleaving the lead to be spliced through the respective buffer so as to define a substantially flat end surface of the respective fiber, said surface extending substantially orthogonally to the longitudinal direction defined by the respective fiber at the location at which cleaving is performed;

for each cable, immersing the lead to be spliced in a liquid which shrinks the respective buffer relative to the respective fiber, a sufficient length of the respective fiber being immersed so that upon shrinkage an end piece of hermetically sealed cladding protrudes from said buffer an longitudinal extent at least equal to twice the diameter of the cladding;

for each fiber, mounting the lead in a respective clamp positioned near the end of the fiber;

inserting the respective clamps into a chamber so that the fiber ends to be spliced are opposed and spaced from one another;

sealing said chamber;

determining whether said leads are coaligned. and, if not, coaligning the fiber leads;

for each fiber, heating the lead end with a laser so as to render the end slightly convex;

for each fiber, moving the fiber with respect to a laser beam so that a portion of said hermetic seal is removed at the end of the respective lead so that said cladding extends longitudinally at least one cladding diameter beyond the remaining hermetic seal;

fusion splicing said fiber leads to yield a spliced fiber including a splice location;

moving said spliced fiber with respect to a laser beam so as to minimize by thermal fusion surface dust on the surface of the exposed cladding about said splice location;

introducing reactant gas into said chamber, said reactant gas being selected so that it can deposit a hermetic seal on a heated cladding;

moving said spliced fiber relative to a laser beam so that a hermetic seal is deposited on the exposed portion of said cladding so that the hermetic seal so deposited is integral with said remaining portions of said hermetic seals;

purging said reactant gas from said chamber;

removing said spliced fiber from said chamber; and applying a protective buffer over said splice position so that the applied protective buffer overlaps the remaining portions of the buffers of the original fiber leads.

38. The method of claim 37 further comprising a preliminary step of removing a protective jacket near the end of each lead so as to expose a length of buffer at least two cladding-diameters long, said method being further characterized in that said protective buffer is applied so that it fills the space between the remaining portions of the protective jackets and has an outer diameter substantially equal to that of said remaining portions of said protective jackets.

39. A fiber splicing apparatus comprising:

first clamping means for holding an end of a first fiber;

second clamping means for holding an end of a second fiber;

adjustment means for varying the relative positions of said first clamping means and said second clamping means such that said ends of said first fiber and said second fiber are juxtaposed;

gas flow means for controlling flow and contents of a gas surrounding said ends; and means for fusing said ends of said first fiber and said second fiber together.

40. A method comprising:

clamping an end of a first fiber;

clamping an end of a second fiber;

adjusting the clamped ends until they are juxtaposed;

fusing said ends together to formed a spliced fiber with a splice location;

surrounding said splice location with a reactant gas; and heating said spliced fiber at said splice location so that said fiber causes said reactant gas to coat said spliced fiber at said splice location.

* * * * *

UNITED STATES PATENT AND TRADEMARK OFFICE
CERTIFICATE OF CORRECTION

PATENT NO. : 4,727,237
DATED : February 23, 1988
INVENTOR(S) : Christopher A. Schantz It is certified that error appears in the above-identified patent and that said Letters Patent is hereby corrected as shown below:

Column 5, Line 29, "there supported" should read --- their supported ---;

Column 6, Line 42, "fooussing lens" should read --- focussing lens ---;

Column 7, Line 10, "well know to" should read --- well known to ---;
Column 10, Line 21, "to achieve dull" should read --- to achieve a dull --;
Column 10, Line 49, "respeective" should read --- respective ---;
Column 10, Line 61, "ooatings" should read --- coatings ---;
Column 12, Line 46, "within spatial" should read --- within a spatial ---;
Column 12, Line 61, "said source" should read --- said sources ---;
Column 15, Line 20, "claim 12" should read --- claim 22 ---;
Column 15, Line 36, "claim 12" should read --- claim 24 ---;
Column 16, Line 15, "form" should read --- from ---.

Signed and Sealed this

Seventh Day of November, 1989

Attest:

JEFFREY M. SAMUELS

*Attesting Officer*     *Acting Commissioner of Patents and Trademarks*